Oct. 30, 1956    R. F. STRIGLE, JR., ET AL    2,768,408
METHOD OF MOLDING FURAN RESINS
Filed Jan. 4, 1954
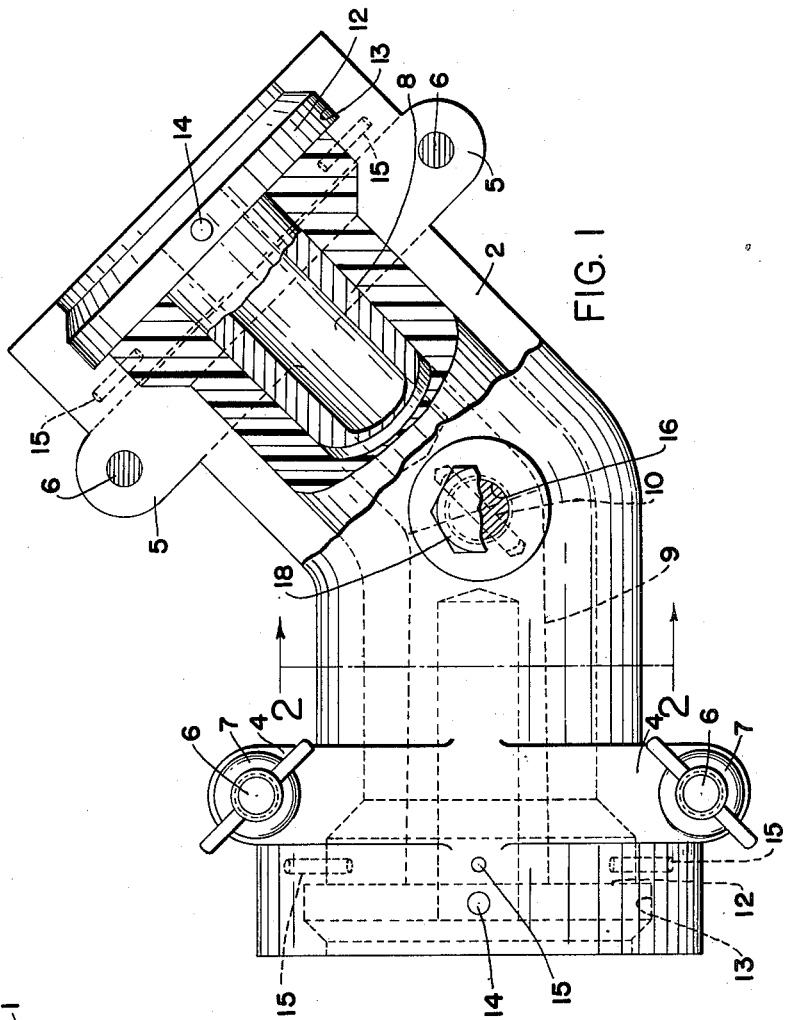
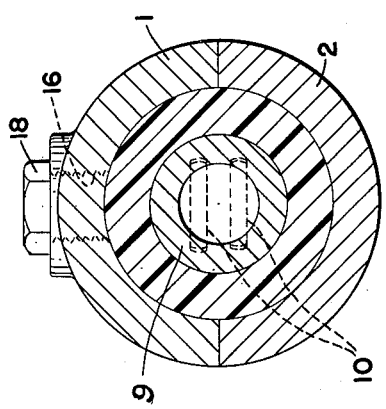
INVENTOR.
RALPH F. STRIGLE, JR.
WILEY SMITH, JR.

United States Patent Office 2,768,408
Patented Oct. 30, 1956

2,768,408

METHOD OF MOLDING FURAN RESINS

Ralph F. Strigle, Jr., and Wiley Smith, Jr., Akron, Ohio, assignors to Maurice A. Knight, Akron, Ohio Application January 4, 1954, Serial No. 401,866

4 Claims. (Cl. 18—55)

The present invention relates to improvements in the method of molding articles from furan resins. These resins have properties which adapt them to the manufacture of acid and corrosion proof equipment for use in the chemical industries, and while the invention is not restricted to that field, it has been perfected primarily for that purpose. The products which have been perfected by the method herein described are tanks, retorts, pipes, valve bodies and the like which are used in various chemical industries.

The furan resins which are more commonly known and which may be used in the process are furfuryl alcohol resins, furfural-phenol resins, furfural-acetone resins, furfural-furfuryl alcohol resins, and furfuryl alcohol-formaldehyde resins. Of these materials, furfuryl alcohol resins have been used most extensively in this field.

These resins set and harden into objects which are useful because of their resistance to corrosion by the reaction between the resin and a catalyst which effects the polymerization of the resin, heat and water being given off during the process. This reaction can be a very violent one and almost an explosive one, so that great care must be exercised in the process.

Referring particularly to the former processes which have employed furfuryl alcohol as the resin component, the reaction of polymerization as brought about by the usual catalytic reaction is so violent as to make it impossible, prior to this invention, to mold this material in closed molds.

For these reasons, one of the methods employed has been to cast the resin in an open mold in layers each approximately ⅛ to ¼ of an inch in thickness. If the layers are not maintained at that thickness the resin will foam up into a useless and shapeless mass.

To cast any object of any strength by the method described, it is necessary to cast layer upon layer of the resin, compounded with the catalyst, and to insert reinforcing material between layers. This reinforcement may be fiberglass or one of the synthetic resinous fibrous materials such as nylon, orlon, or one of the vinyl resins. In addition each layer must reach its initial set before another layer is applied.

The above described method is labor-consuming, expensive, and the possibility of ruining an object during the operation is very great.

A second method which has been used is to build up a form or mandrel of cardboard, wood or metal. The resin, compounded with the catalyst, is applied to the form or mandrel by a brush, squeegee or other tool, and each layer must be allowed to harden before a second layer is applied. A layer made in this manner must be quite thin and not more than 1/32 or 1/16 of an inch thick. Again, the reinforcing material must be applied between layers.

The second method has all of the disadvantages of the first method. In both cases, it is necessary to cure the article in a heated oven after the initial hardening has taken place at room temperature. The purpose of this curing cycle is to cause the resin to further polymerize to an infusible, insoluble material which has the maximum resistance to chemical attack and also to produce a material of maximum physical strength which does not soften on subsequent heating. The heating rate must be closely controlled, otherwise the article will sag, crack, or blister so as to render it unsaleable. The article is usually heated to a temperature between 240° F. and 300° F. and maintained at this temperature for several hours. The article is then cooled slowly to room temperature before removal from the oven. Depending on the size, shape, and weight of the piece, this curing operation may require from a few hours to three days' time.

It is apparent that if a method could be devised by which these resins could be molded and cured in a single operation in a closed mold, many of the hazards and disadvantages of the previous processes could be overcome. While attempts have been made to mold articles from furan resins, particularly furfuryl alcohol resins, none has proved practical or successful until the procedure discovered by the present applicants was perfected and put into actual commercial production.

The process described herein was primarily developed for the manufacture of chemical processing wares using the material known as "Permanite," which is manufactured and sold by Maurice A. Knight of Akron, Ohio, and which is a thermo-setting furfuryl alcohol resin. However, the other furan resins may be used by adoption of the principles set forth with respect to the use of furfuryl alcohol resins.

A typical mold used in the process is shown in the drawings. This mold is used for casting an acid conducting pipe with a 45° bend. Fig. 1 is a side view partially broken away and Fig. 2 is a cross section on the line 2—2 of Fig. 1.

To perform the process there are employed the resinous material, sometimes referred to as a resin binder, a filler, and a catalyst.

As typical, the resinous condensation product employed is formed by heating furfuryl alcohol in the presence of an acid catalyst until the desired viscosity is attained and then subsequently neutralizing the acid catalyst. In addition, the resin is normally dehydrated to remove any water formed by condensation during the resinification procedure.

Typical resins prepared by the above described method, which have been found useful as binders in molded products, are identified by the following properties:

| Properties | Resin #1 | Resin #2 | Resin #3 |
|---|---|---|---|
| Viscosity at 25° C _____cps__ | 25 | 250 | 1,800 |
| Water content (by volume)_____percent__ | 5.2 | 1.3 | 0.7 |
| Monomer content (by weight)_____do____ | 55 | 29 | 12 |
| Specific gravity_____ | 1.17 | 1.20 | 1.20 |
| pH (aqueous phase)_____ | 6.7 | 5.6 | 5.2 |

Other furan resins may be prepared in similar manner, the viscosities in each case being determined by the degree of preliminary polymerization.

The second ingredient, which is the filler, is an inert material or blend of materials which can be added to the resin binder in order to improve certain physical properties of the finished part such as impact, strength, abrasion resistance, etc.; or increase the bulk of the material so as to lower the cost; or to improve the molding operation by changing the properties of the molding paste such as consistency, lubricating action, plasticity, etc.

Typical fillers which can be satisfactorily incorporated in the molding paste are as follows:

1. Carbon, such as: pulverized coke, carbon flour, and furnace black.

2. Silica, such as: sand, silica flour, and quartz powder.

3. Ceramics, such as: porcelain dust, stoneware grog, and crushed brick.

4. Inorganic fibres, such as: asbestos fibre and glass fibre.

5. Organic fibres, such as: polyamide fibres, acrylonitrile fibres, and polyvinyl chloride fibres.

6. Insoluble salts, such as: barium sulfate and calcium silicate.

The selection of the filler from the above list or from analogous materials is determined in a measure by the use to which the product is put. Thus it might be possible to employ vegetable fillers, such as ground wood, nut shells, cotton linters and the like, but these would be attacked by acids or alkalies and could not be used in the chemical field; also, clays might be used, but the product would be attacked by alkalies. For all purposes, therefore, it is desirable to use materials such as listed above which are wholly inert and not affected by the substances which the objects contact in use.

The third ingredient, which is the catalyst, is an acid or acid forming material which produces a high hydrogen ion concentration, thereby catalyzing the further resinification of the resin binder to an infusible, insoluble material. This catalyst usually is a liquid, a solid, or a solution of these materials in a suitable solvent.

Typical materials which have been used as catalysts are: dilute sulfuric acid, dilute hydrochloric acid, phosphoric acid, acetic acid, oxalic acid, toluene sulphonic acid, boron trifluoride, sulphur chloride, sulfamic acid, maleic anhydride, and toluene sulfonyl chloride.

The three ingredients specified above are the main constituents of the molding paste which is injected in the mold such as that shown in the drawing. It is the usual practice to add the filler to the resin binder slowly with vigorous mixing so as to produce a smooth uniform paste and to minimize the entrainment of air. The catalyst is then added to the mix of binder and filler, but as normally the reaction starts very vigorously, almost explosively, shortly after the catalyst is added, the operator should be ready to inject the mixture in the mold almost immediately. About four or five minutes is the time usually allowed. To delay the action, the final admixture which brings the catalyst and the resin together should be done in a mixer which is kept chilled by brine circulation around the mixing bowl. The final mixing operation should be thoroughly done to make a smooth paste.

As an alternative, the catalyst may be thoroughly admixed with the filler and then the filler and catalyst added to the resin binder with the same precautions.

It is quite desirable to remove all air which it is possible to eliminate from the final paste so as to increase the density and reduce the porosity of the finished product. For this reason, the final mixing operation may be carried on in a vacuum chamber.

The following are typical mold paste formulations using the resins set forth above. It will be understood that the formulae set forth are typical and merely point the way in which the materials may be compounded. By giving various specific examples, the invention is not to be limited to them.

*Example No. 1.*—Using a binder of medium viscosity:

18 parts 250 cps. resin binder
24 parts coke flour (100 mesh)
1 part toluene sulfonic acid

*Example No. 2.*—Using a binder of low viscosity:

16 parts 25 cps. resin binder
24 parts coke flour (100 mesh)
1 part toluene sulfonic acid

*Example No. 3.*—Using a binder of medium viscosity and a mixture of fillers:

18 parts 250 cps. resin binder
18 parts coke flour (100 mesh)
18 parts barium sulfate (barytes)
1 part toluene sulfonic acid

*Example No. 4.*—Using a binder of medium viscosity and a catalyst of two components:

18 parts 250 cps. resin binder
24 parts coke flour (100 mesh)
¼ parts toluene sulfonyl chloride
1¼ parts sulfamic acid

*Example No. 5.*—Using a binder of higher viscosity:

50 parts 1800 cps. resin binder
19 parts carbon powder (200 mesh)
1 part furnace black
4 parts toluene sulfonic acid The molding is done in metal molds which are tightly clamped together so as to resist the pressure which is created by the reaction between the catalyst and the binder. The mold may be made of steel which is chrome-plated or it may be made of aluminum with a polished interior mold surface. It is preferable to provide means for heating any core because of the extremely low heat conductivity of the material and the necessity of getting the heat to the molding material as quickly as possible. A loaded mold should be subjected to the heating cycle as soon as possible. The heating of the mold may be done in a furnace equipped with oxy-gas burners which give an intense heat, or the mold may be heated by any method which raises the temperature of the mold rapidly. The core may likewise be heated so that the heat gets to the interior of the mass as quickly as possible. The material which is in the form of a heavy liquid or plastic paste is injected into the closed mold and the injection opening immediately closed.

While the reaction will take place at a minimum of approximately 275° F., it is desirable to heat the material to somewhat higher temperature. Because of the poor heat conductivity of the material, the molds themselves should be heated between 800° F. and 1000° F. to heat the paste throughout at the specified temperatures.

One of the essentials for successful molding of furan resins is the sudden application of the maximum temperature. If the temperature is not raised quickly, the violence of the reaction will be so great as to explode any mold. However, for some reason which is not apparent, if the heat is applied directly to the mold while the mixture is still in paste or liquid form, and before any further polymerization reaction has started, and if the temperature is raised to the desired degree in a short period of time, the reaction goes forward in the mold, the explosive factor is no longer a deterrent, and the product is a fine dense mass with a smooth finish and a perfect replica of the mold cavity. The time which should elapse between the first application of heat and the attainment of the maximum temperature should preferably be about three minutes and not more than six minutes at the maximum, the exact time being dependent upon the quantity of the compound which is in the mold.

As soon as the maximum temperature of the mold is reached, it is removed from the furnace and allowed to stand for two or three minutes to allow the temperature to equalize.

It is now preferable to quench the hot mold, and this should be done very suddenly. The hot mold is plunged in a bath of cold water, which not only immediately cools the mold sufficiently to handle, but tempers the product and stress-relieves it. The chilling of the mold will cause it to open slightly, enough to permit the water to enter the mold and contact the product.

The mold is now opened and the finished product will be found to be a faithful and accurate reproduction of the mold cavity, there is very little rind, and no machining is necessary. The product will have a perceptible sheen. Tests have shown that the product is superior in heat and chemical resistance and is stronger than products made of furan resins by old methods.

The typical mold shown in the drawings comprises upper and lower sections 1 and 2 which are held together by mating lugs 4 and 5 through which pass the clamping bolts 6 held by wing nuts 7. This affords a positive clamp for the mold. As the object to be molded is a pipe section, two core members 8 and 9 are located in the mold, the abutting ends of the cores being held in alignment by pins 10. The ends of the cores are held in position by flanges 12, which are seated in grooves 13 in the bell-like ends of the mold sections. Pins 14 center and hold the ends of the cores. Sprue openings 15 are located in the bell ends of the mold. The cores are shown as hollowed out for quicker transmission of the heat to the molding material. The paste which will ordinarily be of a consistency of thick molasses is injected into the mold from a gun or the like through a filling opening 16 which is closed by a plug 18. While the injection method for loading the mold is preferred, if the paste is too stiff to inject, the mold sections may be filled before the mold is closed.

The process has been described in great detail and it will be realized by those familiar with this art that great economies in production have been realized. The product is more desirable than similar products made by old methods and the time, labor and material saved is a very substantial matter. The details of the process as described are not essential and may be varied within the scope of the appended claims.

The time and temperature for the cure is dependent upon the thickness of the mass to be cured. The figures which have been given are for a piece with approximately one-half inch wall thickness. In molding articles with increased wall thickness the time should be increased and the temperature decreased so as to allow the penetration of the requisite heat to the interior of the mass. In molding articles with a wall thickness less than one-half inch, the temperature should be higher and the time shortened. In every case, however, the maximum temperature should be reached within a few minutes.

What is claimed is:

1. In a process for molding a polymer in which the predominant unit in the polymeric chain is a heterocyclic five-membered ring containing four carbon atoms and one oxygen atom, said polymer being the reaction product of a viscous, thermosetting and exothermic mixture of a polymer forming material and a catalyst which will promote substantially complete polymerization of said polymer forming material, the steps of: filling a mold with a charge of said mixture; closing the mold; applying sufficient heat to said closed mold so that the temperature of the mixture therein increases at a rate in excess of that rate of temperature increases attributable solely to the exothermic polymerization reaction; continuing said application of heat until the temperature of the mold and mixture will be equalized at substantially that degree at which said polymer becomes thermoset; and opening the mold after said polymer has become thermoset and cooling the molded polymer.

2. In a process for molding a polymer in which the predominant unit in the polymeric chain is a heterocyclic five-membered ring containing four carbon atoms and one oxygen atom, said polymer being the reaction product of a viscous, thermosetting and exothermic mixture of a polymer forming material and a catalyst which will promote substantially complete polymerization of said polymer forming material, the steps of: filling a mold with a charge of said mixture; closing the mold; applying sufficient heat to said closed mold so that the temperature of the mixture therein increases at a rate in excess of that rate of temperature increase attributable solely to the exothermic polymerization reaction; continuing said application of heat until the temperature of the mold and mixture will be equalized at substantially that degree at which said polymer becomes thermoset; and quenching the mold.

3. In a process for molding a polymer in which the predominant unit in the polymeric chain is a heterocyclic five-membered ring containing four carbon atoms and one oxygen atom, said polymer being the reaction product of a viscous, thermosetting and exothermic mixture of a polymer forming material and a catalyst which will promote substantially complete polymerization of said polymer forming material, the steps of: filling a mold with a charge of said mixture; closing the mold; applying sufficient heat to said closed mold so as to increase the temperature thereof to between 800–1000° F., in from 3 to 6 minutes, so that said polymer becomes thermoset; and opening the mold after said polymer has become thermoset and cooling the molded polymer.

4. In a process for molding a polymer in which the predominant unit in the polymeric chain is a heterocyclic five-membered ring containing four carbon atoms and one oxygen atom, said polymer being the reaction product of a viscous, thermosetting and exothermic mixture of a polymer forming material and a catalyst which will promote substantially complete polymerization of said polymer forming material, the steps of: filling a mold with a charge of said mixture; closing the mold; applying sufficient heat to said closed mold so as to increase the temperature thereof to between 800–1000° F., in from 3 to 6 minutes, so that said polymer becomes thermoset; and queching the mold.

References Cited in the file of this patent

UNITED STATES PATENTS

| | | |
|---|---|---|
| 1,609,506 | Brock | Dec. 7, 1926 |
| 1,776,366 | Novotny | Sept. 23, 1930 |
| 1,679,387 | Campbell | June 19, 1938 |